(12) United States Patent
Kaji et al.

(10) Patent No.: US 10,003,205 B2
(45) Date of Patent: Jun. 19, 2018

(54) COMPOSITE INTEGRATED CIRCUIT FOR SECONDARY BATTERY, COMPOSITE DEVICE FOR SECONDARY BATTERY, AND BATTERY PACK

(71) Applicants: Hiromichi Kaji, Tokyo (JP); Takashi Imaizumi, Tokyo (JP)

(72) Inventors: Hiromichi Kaji, Tokyo (JP); Takashi Imaizumi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 86 days.

(21) Appl. No.: 15/214,556

(22) Filed: Jul. 20, 2016

(65) Prior Publication Data

US 2017/0033575 A1 Feb. 2, 2017

(30) Foreign Application Priority Data

Jul. 30, 2015 (JP) ................................. 2015-150687

(51) Int. Cl.
*H02J 7/00* (2006.01)

(52) U.S. Cl.
CPC ..... *H02J 7/0029* (2013.01); *H02J 2007/0095* (2013.01)

(58) Field of Classification Search
CPC ................. H02J 7/0029; H02J 2007/0095
USPC ................. 320/106, 112; 361/91.1, 718, 764
See application file for complete search history.

(56) References Cited

U.S. PATENT DOCUMENTS 8,890,482 B2 * 11/2014 Ikeuchi ............. H02J 7/0031
320/134

| | | | |
|---|---|---|---|
| 2005/0242779 A1 * | 11/2005 | Yoshio ............. | H02J 7/0031 320/134 |
| 2009/0153103 A1 | 6/2009 | Ikeuchi et al. | |
| 2010/0129700 A1 | 5/2010 | Tanno | |
| 2012/0249075 A1 * | 10/2012 | Hori ............. | H01M 10/052 320/118 |
| 2013/0050891 A1 * | 2/2013 | Tanaka ............. | H02H 7/18 361/101 |

(Continued)

FOREIGN PATENT DOCUMENTS

| | | |
|---|---|---|
| JP | 2009-153238 | 7/2009 |
| JP | 2010-124640 | 6/2010 |
| KR | 10-2015-0066453 | 6/2015 |

OTHER PUBLICATIONS

Korean Office Action dated Jan. 16, 2017.

*Primary Examiner* — M'Baye Diao

(74) *Attorney, Agent, or Firm* — IPUSA, PLLC

(57) ABSTRACT

A composite integrated circuit includes a protection IC that controls a switching circuit inserted in a power supply line to allow or prevent discharging of the secondary battery, and a monitoring IC that includes a ground terminal connected to the power supply line at a position between the secondary battery and the switching circuit, measures a voltage of the secondary battery, and sends the measured voltage to an external apparatus. The protection IC outputs an activation signal to turn on the switching circuit to allow discharging of the secondary battery, and outputs a deactivation signal to turn off the switching circuit to prevent discharging of the secondary battery. The monitoring IC consumes less power while the deactivation signal is output by the protection IC than the monitoring IC consumes while the activation signal is output by the protection IC.

4 Claims, 4 Drawing Sheets

(56) References Cited

U.S. PATENT DOCUMENTS

2015/0162763 A1 6/2015 Kimura et al.

* cited by examiner

COMPOSITE INTEGRATED CIRCUIT FOR SECONDARY BATTERY, COMPOSITE DEVICE FOR SECONDARY BATTERY, AND BATTERY PACK

CROSS-REFERENCE TO RELATED APPLICATION

The present application is based upon and claims the benefit of priority of Japanese Patent Application No. 2015-150687, filed on Jul. 30, 2015, the entire contents of which are incorporated herein by reference.

BACKGROUND OF THE INVENTION

1. Field of the Invention

An aspect of this disclosure relates to a composite integrated circuit for a secondary battery, a composite device for a secondary battery, and a battery pack.

2. Description of the Related Art

There exists a known battery pack including a protection integrated circuit (IC) that turns off a switching circuit inserted in series in a power supply line connected to a secondary battery to prevent discharging of the secondary battery, and a state detection IC for detecting a state of the secondary battery (see, for example, Japanese Laid-Open Patent Publication No. 2009-153238). A ground terminal of the state detection IC is connected to the power supply line at a position between the secondary battery and the switching circuit.

As described above, a battery pack may include a protection IC for controlling a switching circuit and a battery-side IC (in the case of Japanese Laid-Open Patent Publication No. 2009-153238, "state detection IC") having a ground terminal connected to a power supply line between a secondary battery and the switching circuit. With this configuration, however, because the ground terminal of the battery-side IC is connected to the power supply line between the secondary battery and the switching circuit, the power consumption of the battery-side IC is not reduced even when the switching circuit is turned off by the protection IC to prevent discharging of the secondary battery. Accordingly, with this configuration, discharging of the secondary battery may continue due to the power consumption by the battery-side IC.

SUMMARY OF THE INVENTION

In an aspect of this disclosure, there is provided a composite integrated circuit for a secondary battery. The composite integrated circuit includes a protection IC that is driven by power supplied from the secondary battery and configured to control a switching circuit inserted in series in a power supply line connected to an anode of the secondary battery to allow or prevent discharging of the secondary battery, and a monitoring IC that is driven by the power supplied from the secondary battery and includes a ground terminal connected to the power supply line at a position between the secondary battery and the switching circuit. The monitoring IC measures a voltage of the secondary battery and sends the measured voltage to an external apparatus. The protection IC is configured to output an activation signal to turn on the switching circuit to allow discharging of the secondary battery, and output a deactivation signal to turn off the switching circuit to prevent discharging of the secondary battery. The monitoring IC is configured to consume less power while the deactivation signal is output by the protection IC than the monitoring IC consumes while the activation signal is output by the protection IC.

DESCRIPTION OF THE PREFERRED EMBODIMENTS

Embodiments of the present invention are described below with reference to the accompanying drawings.

Figure 1:
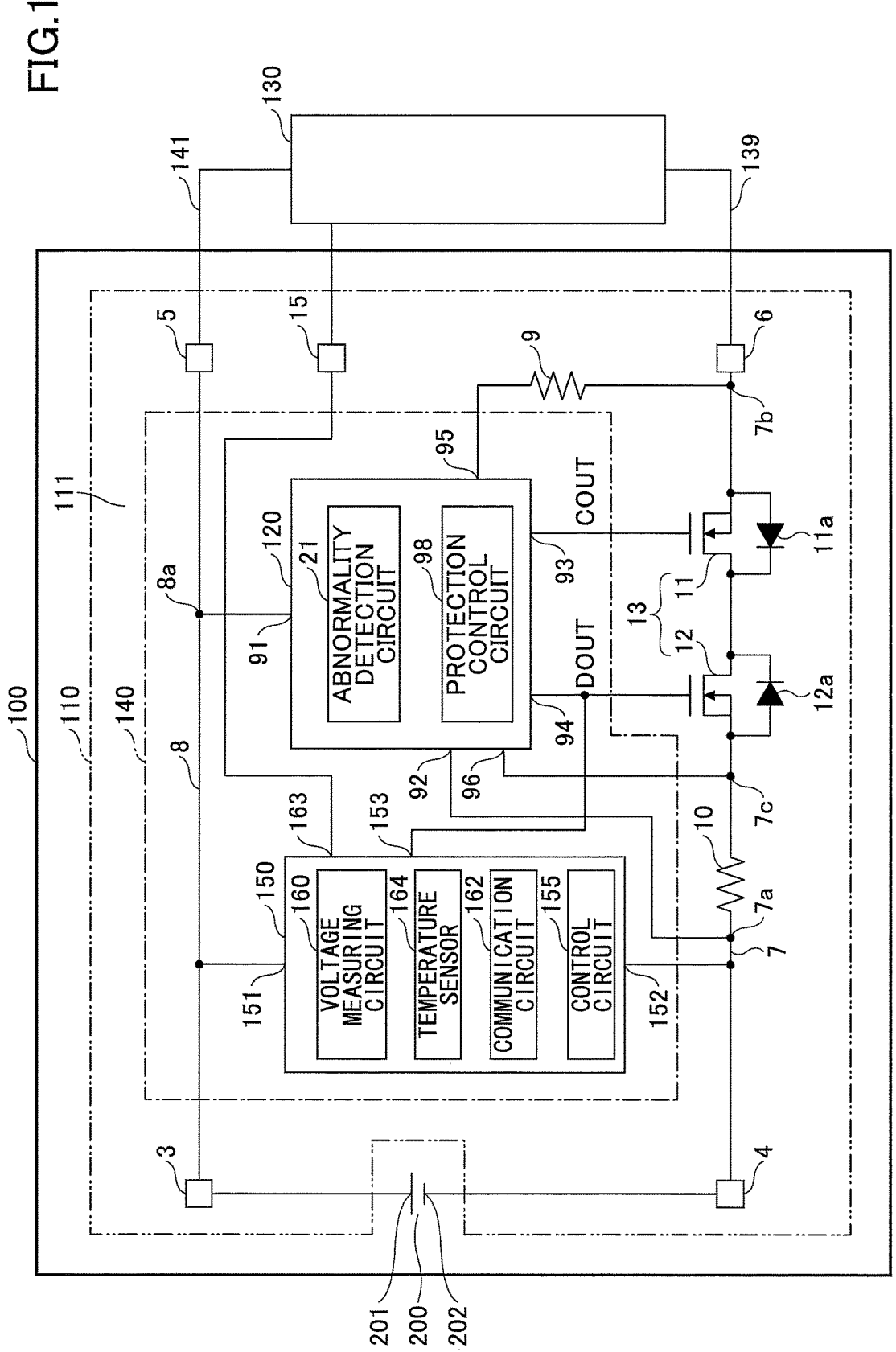
FIG. 1 is a drawing illustrating an exemplary configuration of a battery pack according to an embodiment.

FIG. 1 is a drawing illustrating an exemplary configuration of a battery pack 100 according to an embodiment. The battery pack 100 may include a secondary battery 200 that supplies power to an electronic apparatus 130 connected to a positive terminal 5 and a negative terminal 6 of the battery pack 100, and a composite device 110 connected to the secondary battery 200. The battery pack 100 may be included in the electronic apparatus 130 or externally attached to the electronic apparatus 130.

The electronic apparatus 130 is an example of a load that receives power from the secondary battery 200 of the battery pack 100. The electronic apparatus 130 may be, for example, a mobile terminal such as a cellphone, a smartphone, a tablet computer, a game machine, a television, a music/video player, or a camera.

Examples of the secondary battery 200 may include a lithium-ion battery and a lithium polymer battery.

The composite device 110 is driven by power supplied from the secondary battery 200, and is an example of a composite device for a second battery. The composite device 110 may include a board 111, a resistor 9, a sense resistor 10, a composite integrated circuit 140, a battery-cathode-connecting terminal 3, a battery-anode-connecting terminal 4, a positive terminal 5, a negative terminal 6, a switching circuit 13, and an external communication terminal 15. The resistor 9, the sense resistor 10, the composite integrated circuit 140, and the switching circuit 13 are mounted on the board 111.

The composite integrated circuit 140 is driven by power supplied from the secondary battery 200, and is an example of a composite integrated circuit for a second battery. The composite integrated circuit 140 may include a protection IC 120 and a monitoring IC 150. The composite integrated circuit 140 is, for example, a multichip circuit formed by packaging the protection IC 120 and the monitoring IC 150 in a single package.

The battery-cathode-connecting terminal 3 is connected to a cathode 201 of the secondary battery 200, and the battery-anode-connecting terminal 4 is connected to an anode 202 of the secondary battery 200. The positive terminal 5 is connected to an apparatus power supply line 141 of the electronic apparatus 130. The negative terminal 6 is connected to an apparatus ground 139 of the electronic apparatus 130.

The battery-cathode-connecting terminal 3 and the positive terminal 5 are connected to each other via a positive-side power-supply line 8, and the battery-anode-connecting terminal 4 and the negative terminal 6 are connected to each other via a negative-side power-supply line 7. The positive-side power-supply line 8 is an example of a charge-discharge line between the battery-cathode-connecting terminal 3 and the positive terminal 5. The negative-side power-supply line 7 is an example of a charge-discharge line between the battery-anode-connecting terminal 4 and the negative terminal 6.

The switching circuit 13 of the composite device 110 is inserted in series in a part of the negative-side power-supply line 7 between a first negative-side node 7a and a second negative-side node 7b. The switching circuit 13 is, for example, a series circuit formed by connecting a charge control transistor 11 and a discharge control transistor 12 in series with each other. When the charge control transistor 11 is turned off, the flow of a charging current of the secondary battery 200 through the negative-side power-supply line 7 is blocked. When the discharge control transistor 12 is turned off, the flow of a discharging current of the secondary battery 200 through the negative-side power-supply line 7 is blocked.

Each of the charge control transistor 11 and the discharge control transistor 12 is implemented by, for example, a metal-oxide-semiconductor field-effect transistor (MOSFET). The charge control transistor 11 includes a parasitic diode 11a and is inserted in the negative-side power-supply line 7 such that the forward direction of the parasitic diode 11a matches the discharge direction of the secondary battery 200. The discharge control transistor 12 includes a parasitic diode 12a and is inserted in the negative-side power-supply line 7 such that the forward direction of the parasitic diode 12a matches the charge direction of the secondary battery 200.

Compared with a configuration where the switching circuit 13 is inserted in series in the positive-side power-supply line 8, the configuration where the switching circuit 13 is inserted in series in the negative-side power-supply line 7 makes it possible to reduce the size of the charge control transistor 11 and the discharge control transistor 12 of the switching circuit 13.

The protection IC 120 of the composite integrated circuit 140 is driven by power supplied from the secondary battery 200. The protection IC 120 turns off the switching circuit 13 inserted in series in the negative-side power-supply line 7 connected to the anode 202 of the secondary battery 200 to protect the secondary battery 200 from, for example, an overcurrent. The protection IC 120 controls charging and discharging of the secondary battery 200 via the switching circuit to protect the secondary battery 200 from, for example, an overcurrent. The protection IC 120 receives power from the secondary battery 200 as well as protects the secondary battery 200.

The protection IC 120 may include a power supply terminal 91, a ground terminal 92, a charge control output terminal 93, a discharge control output terminal 94, a connection detection terminal 95, and a current detection terminal 96.

The power supply terminal 91 is a cathode-side power-supply terminal connected via a positive-side node 8a and the battery-cathode-connecting terminal 3 to the cathode 201 of the secondary battery 200, and may be referred to as a VDD terminal.

The ground terminal 92 is an anode-side power-supply terminal connected via the first negative-side node 7a and the battery-anode-connecting terminal 4 to the anode 202 of the secondary battery 200, and may be referred to as a VSS terminal. Also, the ground terminal 92 is connected to the negative-side power-supply line 7 at the first negative-side node 7a and connected via the sense resistor 10 to the source of the discharge control transistor 12.

The charge control output terminal 93 outputs a charge control signal for controlling whether to allow charging of the secondary battery 200, and may be referred to as a COUT terminal. The charge control output terminal 93 is connected to a control terminal (in the case of a MOSFET, the gate) of the charge control transistor 11.

The discharge control output terminal 94 outputs a discharge control signal for controlling whether to allow discharging of the secondary battery 200, and may be referred to as a DOUT terminal. The discharge control output terminal 94 is connected to a control terminal (in the case of a MOSFET, the gate) of the discharge control transistor 12.

The connection detection terminal 95 is connected via the negative terminal 6 to the apparatus ground 139 of the electronic apparatus 130, and may be referred to as a V-terminal. The connection detection terminal 95 is connected via the resistor 9 to the negative-side power-supply line 7 at the second negative-side node 7b between the negative terminal 6 and the charge control transistor 11. Also, the connection detection terminal 95 is connected via the resistor 9 to the source of the charge control transistor 11.

The current detection terminal 96 is connected to the negative-side power-supply line 7 at a third negative-side node 7c that is on the opposite side of the sense resistor 10 from the first negative-side node 7a, and may be referred to as a CS terminal. The sense resistor 10 is a current detection resistor that is inserted in series in the negative-side power-supply line 7. One end of the sense resistor 10 is connected via the first negative-side node 7a to the anode 202 of the secondary battery 200 and the ground terminal 92, and another end of the sense resistor 10 is connected via the third negative-side node 7c to the source of the discharge control transistor 12 and the current detection terminal 96.

The protection IC 120 performs protection operations for preventing discharging and charging of the secondary battery 200 by turning off the switching circuit 13. The protection IC 120 may include an abnormality detection circuit 21 and a protection control circuit 98. The abnormality detection circuit 21 is an example of a component for detecting an abnormality in the current or the voltage of the secondary battery 200. Based on the detection result of the abnormality detection circuit 21, the protection control circuit 98 outputs a control signal to turn on or off the charge control transistor 11 or the discharge control transistor 12 of the switching circuit 13.

The protection control circuit 98, for example, performs an operation (overcharge protection operation) to protect the secondary battery 200 from an overcharge by controlling the charge control transistor 11. For example, the abnormality detection circuit 21 detects a voltage between the power supply terminal 91 and the ground terminal 92 to monitor the cell voltage of the secondary battery 200. When a cell voltage greater than or equal to a predetermined overcharge detection voltage Vdet1 is detected, the abnormality detection circuit 21 outputs an overcharge detection signal indicating the detection of an overcharge of the secondary battery 200.

When the overcharge detection signal is detected, the protection control circuit 98 waits until a predetermined overcharge detection delay time tVdet1 passes, and then performs an overcharge protection operation by outputting, from the charge control output terminal 93, a low-level charge control signal COUT to turn off the charge control transistor 11. When the charge control transistor 11 is turned off, charging of the secondary battery 200 is prevented regardless of whether the discharge control transistor 12 is turned on or off, and the secondary battery 200 is protected from an overcharge.

The protection control circuit 98, for example, performs an operation (overdischarge protection operation) to protect the secondary battery 200 from an overdischarge by controlling the discharge control transistor 12. For example, the abnormality detection circuit 21 detects a voltage between the power supply terminal 91 and the ground terminal 92 to monitor the cell voltage of the secondary battery 200. When a cell voltage less than or equal to a predetermined overdischarge detection voltage Vdet2 is detected, the abnormality detection circuit 21 outputs an overdischarge detection signal indicating the detection of an overdischarge of the secondary battery 200.

When the overdischarge detection signal is detected, the protection control circuit 98 waits until a predetermined overdischarge detection delay time tVdet2 passes, and then performs an overdischarge protection operation by outputting, from the discharge control output terminal 94, a low-level discharge control signal DOUT to turn off the discharge control transistor 12. When the discharge control transistor 12 is turned off, discharging of the secondary battery 200 is prevented regardless of whether the charge control transistor 11 is turned on or off, and the secondary battery 200 is protected from an overdischarge.

The protection control circuit 98, for example, performs an operation (discharge overcurrent protection operation) to protect the secondary battery 200 from a discharge overcurrent by controlling the discharge control transistor 12. For example, the abnormality detection circuit 21 detects a sense voltage that appears between the current detection terminal 96 and the ground terminal 92 due to a current flowing through the sense resistor 10. When a sense voltage greater than or equal to a predetermined discharge overcurrent detection voltage Vdet3 is detected, the abnormality detection circuit 21 outputs a discharge overcurrent detection signal indicating the detection of a discharge overcurrent that is an abnormal current flowing through the negative-side power-supply line 7 in the discharge direction of the secondary battery 200.

When the discharge overcurrent detection signal is detected, the protection control circuit 98 waits until a predetermined discharge overcurrent detection delay time tVdet3 passes, and then performs a discharge overcurrent protection operation by outputting, from the discharge control output terminal 94, a low-level discharge control signal DOUT to turn off the discharge control transistor 12. When the discharge control transistor 12 is turned off, discharging of the secondary battery 200 is prevented regardless of whether the charge control transistor 11 is turned on or off, and the flow of the overcurrent in the discharge direction of the secondary battery 200 is prevented.

The protection control circuit 98, for example, performs an operation (charge overcurrent protection operation) to protect the secondary battery 200 from a charge overcurrent by controlling the charge control transistor 11. For example, the abnormality detection circuit 21 detects a sense voltage that appears between the current detection terminal 96 and the ground terminal 92 due to a current flowing through the sense resistor 10. When a sense voltage less than or equal to a predetermined charge overcurrent detection voltage Vdet4 is detected, the abnormality detection circuit 21 outputs a charge overcurrent detection signal indicating the detection of a charge overcurrent that is an abnormal current flowing through the negative-side power-supply line 7 in the charge direction of the secondary battery 200.

When the charge overcurrent detection signal is detected, the protection control circuit 98 waits until a predetermined charge overcurrent detection delay time tVdet4 passes, and then performs a charge overcurrent protection operation by outputting, from the charge control output terminal 93, a low-level charge control signal COUT to turn off the charge control transistor 11. When the charge control transistor 11 is turned off, charging of the secondary battery 200 is prevented regardless of whether the discharge control transistor 12 is turned on or off, and the flow of the overcurrent in the charge direction of the secondary battery 200 is prevented.

The protection control circuit 98, for example, performs an operation (short-circuit protection operation) to protect the secondary battery 200 from a short-circuit current by controlling the discharge control transistor 12. For example, when a voltage greater than or equal to a predetermined first short-circuit detection voltage Vshort1 is detected between the current detection terminal 96 and the ground terminal 92, the abnormality detection circuit 21 outputs a short-circuit detection signal indicating the detection of a short circuit between the positive terminal 5 and the negative terminal 6. As another example, when a voltage greater than or equal to a predetermined second short-circuit detection voltage Vshort2 is detected between the connection detection terminal 95 and the ground terminal 92, the abnormality detection circuit 21 outputs a short-circuit detection signal indicating the detection of a short circuit between the positive terminal 5 and the negative terminal 6. The second short-circuit detection voltage Vshort2 is sufficiently greater than the first short-circuit detection voltage Vshort1.

When the short-circuit detection signal is detected, the protection control circuit 98 performs a short-circuit protection operation by outputting, from the discharge control output terminal 94, a low-level control signal to turn off the discharge control transistor 12. When the discharge control transistor 12 is turned off, discharging of the secondary battery 200 is prevented regardless of whether the charge control transistor 11 is turned on or off, and the flow of the short-circuit current in the discharge direction of the secondary battery 200 is prevented.

When no abnormality (neither the overcharge nor the charge overcurrent) that makes it necessary to prevent charging of the secondary battery 200 is detected by the abnormality detection circuit 21, the protection control circuit 98 outputs, from the charge control output terminal 93, a high-level charge control signal COUT to turn on the charge control transistor 11. That is, by outputting the high-level charge control signal COUT to turn on the charge control transistor 11 from the charge control output terminal 93, the protection control circuit 98 allows charging of the secondary battery 200.

Also, when no abnormality (none of the overdischarge, the discharge overcurrent, and the short circuit) that makes it necessary to prevent discharging of the secondary battery 200 is detected by the abnormality detection circuit 21, the protection control circuit 98 outputs, from the discharge control output terminal 94, a high-level discharge control signal DOUT to turn on the discharge control transistor 12. That is, by outputting the high-level discharge control signal DOUT to turn on the discharge control transistor 12 from the discharge control output terminal 94, the protection control circuit 98 allows discharging of the secondary battery 200.

The low-level charge control signal COUT to turn off the charge control transistor 11 is an example of a deactivation signal to prevent charging of the secondary battery 200, and the high-level charge control signal COUT to turn on the charge control transistor 11 is an example of an activation signal to allow charging of the secondary battery 200. The low-level discharge control signal DOUT to turn off the discharge control transistor 12 is an example of a deactivation signal to prevent discharging of the secondary battery 200, and the high-level discharge control signal DOUT to turn on the discharge control transistor 12 is an example of an activation signal to allow discharging of the secondary battery 200.

The monitoring IC 150 is driven by power supplied from the secondary battery 200, measures the voltage of the secondary battery 200, and sends the measurement of the voltage to an external component or apparatus. In addition to measuring the voltage of the secondary battery 200, the monitoring IC 150 may be configured to measure battery status including at least one of the current, the temperature, and the remaining power level of the secondary battery 200 and send the measured battery status to an external component or apparatus.

The monitoring IC 150 may include a power supply terminal 151, a ground terminal 152, a discharge control input terminal 153, a communication terminal 163, a voltage measuring circuit 160, a communication circuit 162, a temperature sensor 164, and a control circuit 155.

The power supply terminal 151 is connected to the positive-side power-supply line 8. The ground terminal 152 is connected to the negative-side power-supply line 7 at a position between the anode 202 of the secondary battery 200 and the discharge control transistor 12 of the switching circuit 13. The monitoring IC 150 is driven by a supply voltage between the power supply terminal 151 and the ground terminal 152. The discharge control input terminal 153 receives the discharge control signal DOUT, and is connected to a signal line (through which the discharge control signal DOUT is transmitted) between the discharge control output terminal 94 and the gate of the discharge control transistor 12.

The voltage measuring circuit 160 is an example of a circuit for measuring the cell voltage of the secondary battery 200. For example, the voltage measuring circuit 160 measures the cell voltage of the secondary battery 200 by detecting the supply voltage between the power supply terminal 151 and the ground terminal 152. Connecting the ground terminal 152 to the negative-side power-supply line 7 at a position between the anode 202 and the switching circuit 13 makes it possible to exclude the voltage drop caused by the parasitic resistance of the switching circuit 13 from the cell voltage measured by the voltage measuring circuit 160. Also, connecting the ground terminal 152 to the negative-side power-supply line 7 at a position between the anode 202 and the sense resistor 10 makes it possible to exclude even the voltage drop caused by the resistance of the sense resistor 10 from the cell voltage measured by the voltage measuring circuit 160.

The communication circuit 162 sends a measurement of the cell voltage measured by the voltage measuring circuit 160 via the communication terminal 163 to a component or an apparatus outside of the monitoring IC 150. The communication terminal 163 is connected to the external communication terminal 15 that is connected to the electronic apparatus 130. Accordingly, the communication circuit 162 can send the measurement of the cell voltage to the electronic apparatus 130. The communication circuit 162 may also be configured to send the measurement of the cell voltage via the protection IC 120 to the electronic apparatus 130.

The control circuit 155 performs a predetermined operation while the low-level discharge control signal DOUT, to turn off the discharge control transistor 12, is input to the discharge control input terminal 153.

According to the embodiment of FIG. 1, the low-level discharge control signal DOUT may be used as a trigger to start a predetermined operation performed by the monitoring IC 150. This makes it possible to cause the monitoring IC 150 to perform a predetermined operation in conjunction with a protection operation (e.g., the overdischarge protection operation or the discharge overcurrent protection operation) performed by the protection IC 120.

For example, the voltage measuring circuit 160 may be configured to measure the cell voltage of the secondary battery 200 and the communication circuit 162 may be configured to send the value of the cell voltage measured by the voltage measuring circuit 160, while the high-level discharge control signal DOUT is input to the discharge control input terminal 153. Also, the control circuit 155 may be configured to set the power mode of the monitoring IC 150 to a normal mode and to not perform an operation (power reduction operation) for reducing the power consumption of the monitoring IC 150 while the high-level discharge control signal DOUT is input to the discharge control input terminal 153. Also, the control circuit 155 may be configured to set the power mode of the monitoring IC 150 to a power-saving mode and to perform a power reduction operation while the low-level discharge control signal DOUT is input to the discharge control input terminal 153. That is, the control circuit 155 may be configured to reduce the power consumed by the monitoring IC 150 while the low-level discharge control signal DOUT is input to the discharge control input terminal 153 compared to the power consumed by the monitoring IC 150 while the high-level discharge control signal DOUT is input to the discharge control input terminal 153. In still other words, the monitoring IC 150 is configured to consume less power while the low-level discharge a control signal DOUT is input to the discharge control input terminal 153 than the monitoring IC 150 consumes while the high-level discharge control signal DOUT is input to the discharge control input terminal 153.

With the above configuration, the monitoring IC 150 can control its own power mode according to the protection operation performed by the protection IC 120, and can avoid continuously consuming the electric current while the protection operation is being performed by the protection IC 120 (i.e., during a protection mode of the secondary battery 200). That is, the above configuration makes it possible to prevent the discharge of the secondary battery 200 from proceeding further due to the current consumption of the monitoring IC 150 during the protection mode where discharging of the secondary battery 200 is prevented by the protection IC 120.

For example, when an overdischarge of the secondary battery 200 is detected by the abnormality detection circuit 21, the protection IC 120 outputs the low-level discharge control signal DOUT from the discharge control output terminal 94. Accordingly, in an overdischarge-detected state where discharging of the secondary battery 200 is prevented by the protection IC 120, the monitoring IC 150 can prevent the discharge of the secondary battery 200 from proceeding due to the power consumption of the monitoring IC 150 itself.

The protection control circuit 98 of the protection IC 120 may be configured to reduce the power consumed by the protection IC 120 while an overdischarge of the secondary battery 200 is being detected by the abnormality detection circuit 21 compared to the power consumed by the protection IC 120 while no overdischarge of the secondary battery 200 is being detected by the abnormality detection circuit 21. In other words, the protection IC 120 is configured to consume less power while an overdischarge of the secondary battery 200 is being detected than the protection IC 120 consumes while no overdischarge of the secondary battery 200 is being detected. Accordingly, in an overdischarge-detected state where discharging of the secondary battery 200 is prevented, the protection IC 120 can prevent the discharge of the secondary battery 200 from proceeding due to the power consumption of the protection IC 120 itself.

Figure 2:
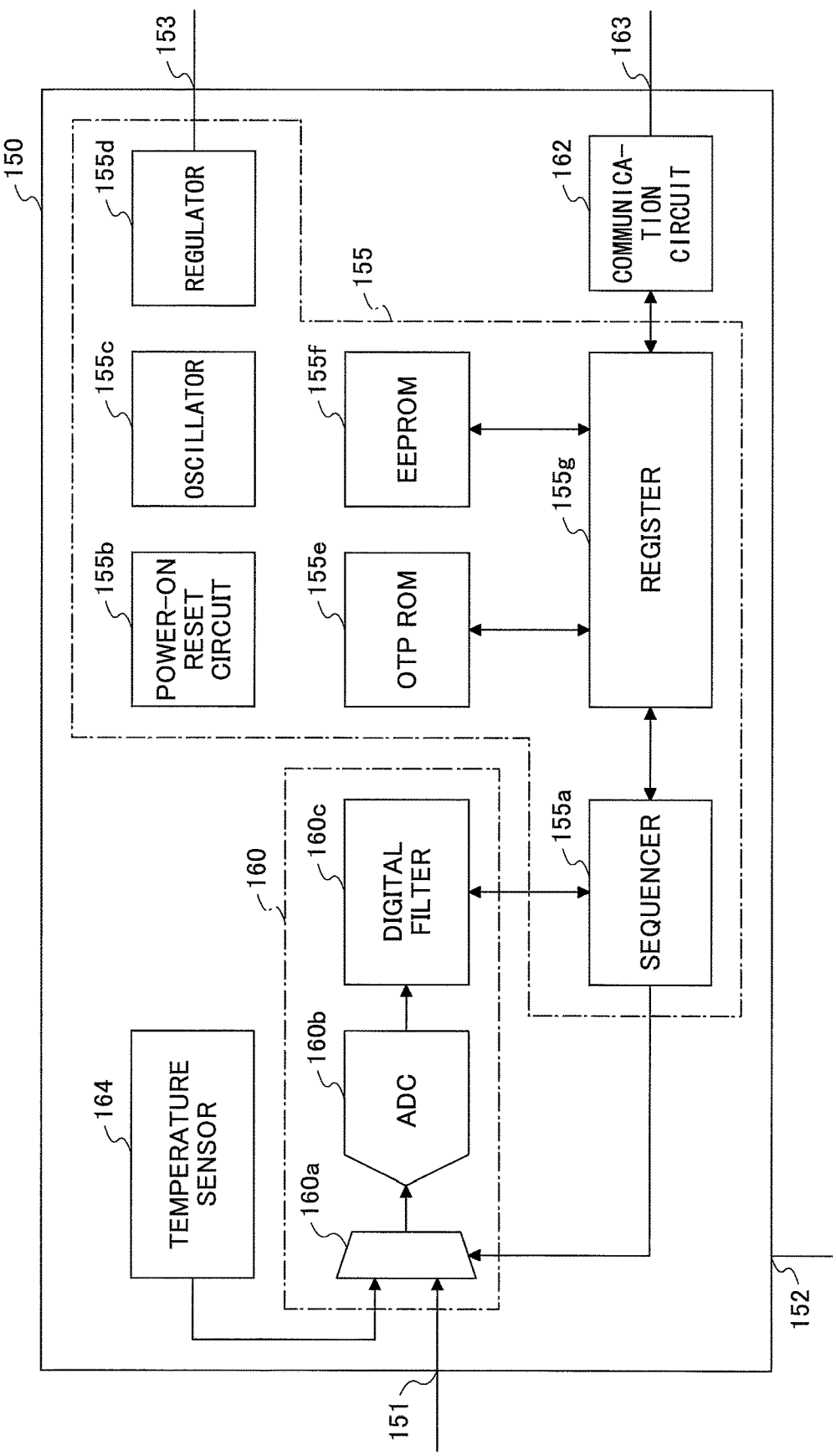
FIG. 2 is a drawing illustrating an exemplary configuration of a monitoring IC according to the embodiment.

FIG. 2 is a drawing illustrating an exemplary configuration of the monitoring IC 150 according to the present embodiment. The monitoring IC 150 may include the temperature sensor 164, the voltage measuring circuit 160, the communication circuit 162, and the control circuit 155. The voltage measuring circuit 160 may include a multiplexer 160a, an analog-to-digital converter (ADC) 160b, and a digital filter 160c. The control circuit 155 may include a sequencer 155a, a power-on reset circuit 155b, an oscillator 155c, a regulator 155d, a one-time programmable read-only memory (OTP ROM) 155e, an electrically erasable programmable read-only memory (EEPROM) 155f, and a register 155g.

The sequencer 155a starts operating in response to a reset cancellation signal from the power-on reset circuit 155b. The multiplexer 160a is a selection circuit that selects one of a sensor voltage from the temperature sensor 164 and the supply voltage between the power supply terminal 151 and the ground terminal 152 according to the sequencer 155a, and outputs the selected sensor voltage or supply voltage to the ADC 160b. The temperature sensor 164 measures the internal temperature of the monitoring IC 150, and outputs a sensor voltage corresponding to the measured internal temperature. The sequencer 155a, without instructions from an external apparatus such as the electronic apparatus 130, causes the ADC 160b to periodically and repeatedly perform the AD conversion of the supply voltage between the power supply terminal 151 and the ground terminal 152 and the AD conversion of the sensor voltage from the temperature sensor 164. The supply voltage and the sensor voltage converted by the ADC 160b are filtered by the digital filter 160c and input to the sequencer 155a.

Based on the supply voltage converted by the ADC 160b (i.e., the supply voltage filtered by the digital filter 160c), the sequencer 155a calculates a cell voltage of the secondary battery 200, and stores the value of the calculated cell voltage in the register 155g. Also, based on the sensor voltage converted by the ADC 160b (i.e., the sensor voltage filtered by the digital filter 160c), the sequencer 155a calculates an ambient temperature of the monitoring IC 150 (e.g., the internal temperature of the battery pack 100 or the temperature of the secondary battery 200), and stores the value of the calculated ambient temperature in the register 155g.

The sequencer 155a may be configured to correct the calculated cell voltage of the secondary battery 200 based on the calculated ambient temperature of the monitoring IC 150, and to store the corrected cell voltage in the register 155g. The communication circuit 162 is an interface that when the corrected cell voltage indicates an abnormal value, reports the detection of the abnormal value via the communication terminal 163 to the electronic apparatus 130 that is a host apparatus.

The regulator 155d of the control circuit 155 limits power supplied to the internal circuits of the monitoring IC 150 while the low-level discharge control signal DOUT is input to the discharge control input terminal 153. The internal circuits of the monitoring IC 150 may include analog circuits and digital circuits. Examples of the analog circuits include the temperature sensor 164, the oscillator 155c, and the ADC 160b. Examples of the digital circuits include the sequencer 155a, the register 155g, and the communication circuit 162.

For example, the regulator 155d is a power supply circuit that down-regulates the supply voltage between the power supply terminal 151 and the ground terminal 152 to generate a regulated voltage. The regulated voltage is used as an operating voltage of the internal circuits of the monitoring IC 150. While the low-level discharge control signal DOUT is input to the discharge control input terminal 153, the regulator 155d performs a power reduction operation to limit the power supplied to the internal circuits of the monitoring IC 150 by setting the regulated voltage at a small value or zero.

Figure 3:
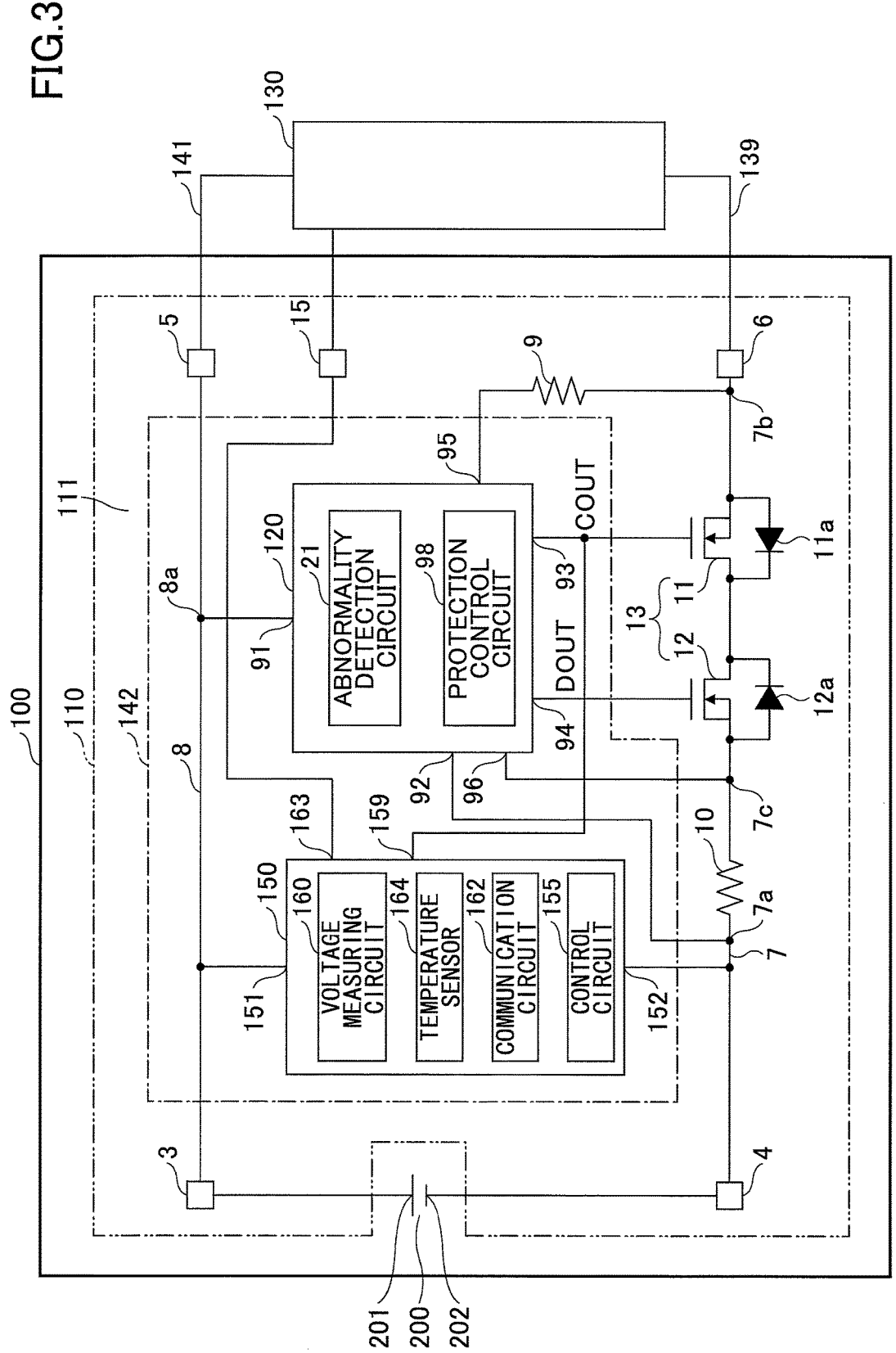
FIG. 3 is a drawing illustrating an exemplary configuration of a battery pack according to another embodiment.

FIG. 3 is a drawing illustrating an exemplary configuration of a battery pack 100 according to another embodiment. Descriptions of components of FIG. 3 having substantially the same functions as those of FIG. 1 are omitted. The battery pack 100 of FIG. 3 includes a composite integrated circuit 142. The composite integrated circuit 142 is driven by power supplied from the secondary battery 200, and is an example of a composite integrated circuit for a second battery.

The monitoring IC 150 includes a charge control input terminal 159. The charge control input terminal 159 receives the charge control signal COUT, and is connected to a signal line (through which the charge control signal COUT is transmitted) between the charge control output terminal 93 and the gate of the charge control transistor 11.

The control circuit 155 performs a predetermined operation while the low-level charge control signal COUT to turn off the charge control transistor 11 is input to the charge control input terminal 159.

According to the embodiment of FIG. 3, the low-level charge control signal COUT may be used as a trigger to start a predetermined operation performed by the monitoring IC 150. This makes it possible to cause the monitoring IC 150 to perform a predetermined operation in conjunction with a protection operation (e.g., the overcharge protection operation or the charge overcurrent protection operation) performed by the protection IC 120.

Figure 4:
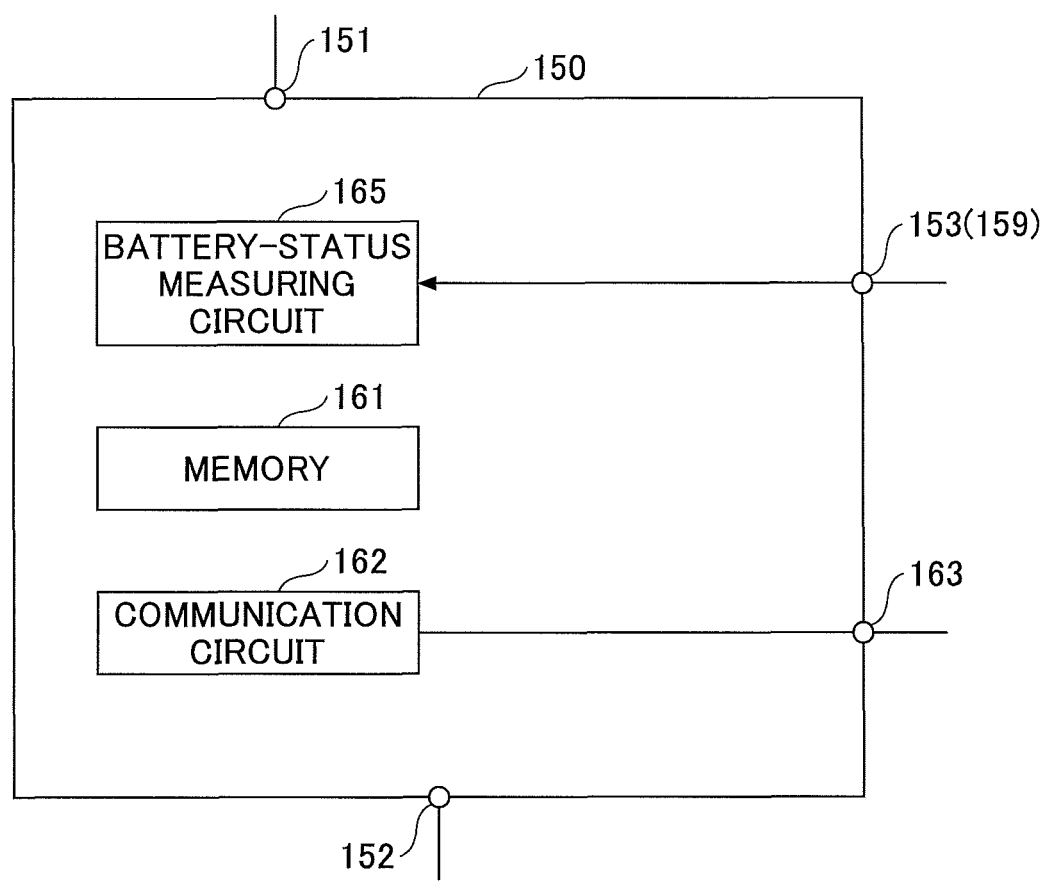
FIG. 4 is a drawing illustrating an exemplary configuration of a monitoring IC according to another embodiment.

FIG. 4 is a drawing illustrating an exemplary configuration of the monitoring IC 150 according to another embodiment. The monitoring IC 150 of FIG. 4 includes a battery-status measuring circuit 165, a memory 161, and a communication circuit 162.

The battery-status measuring circuit 165 measures battery status of the secondary battery 200 while the low-level discharge control signal DOUT is input to the discharge control input terminal 153. For example, the battery-status measuring circuit 165 measures battery status including at least one of the voltage, the current, the temperature, and the remaining power level of the secondary battery 200.

The communication circuit 162 sends the battery status measured by the battery-status measuring circuit 165 via the communication terminal 163 of the monitoring IC 150. For example, the communication circuit 162 sends the battery status measured by the battery-status measuring circuit 165 via the communication terminal 163 to the electronic apparatus 130. Thus, the monitoring IC 150 can send, to the electronic apparatus 130, the battery status measured by the battery-status measuring circuit 165 while a protection operation is being performed by the protection IC 120 (i.e., during the protection mode of the secondary battery 200).

The memory 161 stores the battery status measured by the battery-status measuring circuit 165. For example, the memory 161 may be implemented by a nonvolatile memory (e.g., the OTP ROM 155e or the EEPROM 155f of FIG. 2). Thus, the memory 161 can store the battery status of the secondary battery 200 during the protection mode. The communication circuit 162 sends the battery status stored in the memory 161 to the electronic apparatus 130.

For example, the battery-status measuring circuit 165 starts a timer when the discharge control signal DOUT input to the discharge control input terminal 153 changes from the high level to the low level, and measures time up to the timing when the protection mode is canceled. The timing when the protection mode is canceled indicates the timing when the discharge control signal DOUT input to the discharge control input terminal 153 changes from the low level to the high level. The communication circuit 162 sends the time measured by the battery-status measuring circuit 165 to the electronic apparatus 130 so that the electronic apparatus 130 can determine the duration of the protection mode.

For example, when the discharge control signal DOUT input to the discharge control input terminal 153 changes from the high level to the low level, the battery-status measuring circuit 165 changes the operation mode of the monitoring IC 150 to a measurement mode for periodically measuring the battery status and thereby starts periodic measuring of the battery status of the secondary battery 200 in the protection mode. Thus, the battery-status measuring circuit 165 can obtain a log of battery status such as the voltage of the secondary battery 200, and can measure changes in the battery status of the secondary battery 200 in the protection mode. For example, the battery-status measuring circuit 165 records, in the memory 161, the lowest voltage of the secondary battery 200 in an overdischarge state or the highest voltage of the secondary battery 200 in an overcharge state. The communication circuit 162 sends the lowest voltage in the overdischarge state or the highest voltage in the overcharge state stored in the memory 161 to the electronic apparatus 130 so that the electronic apparatus 130 can determine more detailed behavior of the secondary battery 200 in the protection mode.

In FIG. 4, the discharge control input terminal 153 receiving the discharge control signal DOUT may be replaced with the charge control input terminal 159 receiving the charge control signal COUT.

Also, the monitoring IC 150 may include both of the discharge control input terminal 153 and the charge control input terminal 159, and use both of the discharge control signal DOUT and the charge control signal COUT to control its operation.

Also, the switching circuit 13 may be included in the composite integrated circuit 140.

An aspect of this disclosure provides a composite integrated circuit for a secondary battery, a composite device for a secondary battery, and a battery pack than can prevent the discharge of a secondary battery from proceeding.

A composite integrated circuit for a secondary battery, a composite device for a secondary battery, and a battery pack according to the embodiments of the present invention are described above. However, the present invention is not limited to the specifically disclosed embodiments, and variations and modifications may be made without departing from the scope of the present invention. Also, the above-described embodiments may be combined in any appropriate manner.

What is claimed is:

1. A composite integrated circuit for a secondary battery, the composite integrated circuit comprising:
   a protection IC that is driven by power supplied from the secondary battery and configured to control a switching circuit inserted in series in a power supply line connected to an anode of the secondary battery to allow or prevent discharging of the secondary battery; and
   a monitoring IC that is driven by the power supplied from the secondary battery and includes a ground terminal connected to the power supply line at a position between the secondary battery and the switching circuit, the monitoring IC being configured to measure a voltage of the secondary battery and send the measured voltage to an external apparatus, wherein
   the protection IC is configured to
      output an activation signal to turn on the switching circuit to allow discharging of the secondary battery, and
      output a deactivation signal to turn off the switching circuit to prevent discharging of the secondary battery;
   the monitoring IC is configured to set a power mode of the monitoring IC to a power-saving mode while the deactivation signal is output by the protection IC and set the power mode to a normal mode while the activation signal is output by the protection IC, the monitoring IC consuming less power in the power-saving mode than in the normal mode; and
   the monitoring IC further includes a regulator configured to
      output a first voltage while the monitoring IC is in the normal mode, and
      output a second voltage lower than the first voltage to limit power supplied to an internal circuit of the monitoring IC while the monitoring IC is in the power-saving mode.

2. The composite integrated circuit according to claim 1, wherein the protection IC is configured to
   output the deactivation signal while an overdischarge of the secondary battery is detected, and
   consume less power while the overdischarge of the secondary battery is detected than the protection IC consumes while the overdischarge of the secondary battery is not detected.

3. A composite device for a secondary battery, the composite device comprising:
   a switching circuit inserted in series in a power supply line connected to an anode of the secondary battery; and
   a composite integrated circuit including
      a protection IC that is driven by power supplied from the secondary battery and configured to control the switching circuit to allow or prevent discharging of the secondary battery, and
      a monitoring IC that is driven by the power supplied from the secondary battery and includes a ground terminal connected to the power supply line at a position between the secondary battery and the switching circuit, the monitoring IC being configured to measure a voltage of the secondary battery and send the measured voltage to an external apparatus, wherein the protection IC is configured to
   output an activation signal to turn on the switching circuit to allow discharging of the secondary battery, and
   output a deactivation signal to turn off the switching circuit to prevent discharging of the secondary battery;
the monitoring IC is configured to set a power mode of the monitoring IC to a power-saving mode while the deactivation signal is output by the protection IC and set the power mode to a normal mode while the activation signal is output by the protection IC, the monitoring IC consuming less power in the power-saving mode than in the normal mode; and
the monitoring IC further includes a regulator configured to
   output a first voltage while the monitoring IC is in the normal mode, and
   output a second voltage lower than the first voltage to limit power supplied to an internal circuit of the monitoring IC while the monitoring IC is in the power-saving mode.

4. A battery pack, comprising:
a secondary battery; and
a composite device including
   a switching circuit inserted in series in a power supply line connected to an anode of the secondary battery, and
   a composite integrated circuit including
      a protection IC that is driven by power supplied from the secondary battery and configured to control the switching circuit to allow or prevent discharging of the secondary battery, and
      a monitoring IC that is driven by the power supplied from the secondary battery and includes a ground terminal connected to the power supply line at a position between the secondary battery and the switching circuit, the monitoring IC being configured to measure a voltage of the secondary battery and send the measured voltage to an external apparatus, wherein
the protection IC is configured to
   output an activation signal to turn on the switching circuit to allow discharging of the secondary battery, and
   output a deactivation signal to turn off the switching circuit to prevent discharging of the secondary battery;
the monitoring IC is configured to set a power mode of the monitoring IC to a power-saving mode while the deactivation signal is output by the protection IC and set the power mode to a normal mode while the activation signal is output by the protection IC, the monitoring IC consuming less power in the power-saving mode than in the normal mode; and
the monitoring IC further includes a regulator configured to
   output a first voltage while the monitoring IC is in the normal mode, and
   output a second voltage lower than the first voltage to limit power supplied to an internal circuit of the monitoring IC while the monitoring IC is in the power-saving mode.

* * * * *